United States Patent [19]

Firth et al.

[11] 4,395,088
[45] Jul. 26, 1983

[54] COLOR SELECTIVE FILTERS

[75] Inventors: Kenneth Firth, Chelmsford; Richard K. Howard, Witham, both of England

[73] Assignee: The Marconi Company Limited, Chelmsford, England

[21] Appl. No.: 242,610

[22] Filed: Mar. 11, 1981

[30] Foreign Application Priority Data

Mar. 13, 1980 [GB] United Kingdom ............... 8008564

[51] Int. Cl.³ .................... G03H 1/04; G03H 1/26
[52] U.S. Cl. ................................... 350/3.7; 350/320
[58] Field of Search ............... 350/320, 162 R, 3.7, 350/3.65, 166, 3.81, 3.60, 162.19, 162.23, 3.11

[56] References Cited

U.S. PATENT DOCUMENTS

| 3,635,539 | 1972 | MaMahon ................. 350/3.5 |
| 3,675,990 | 1972 | Kogelnik et al. .......... 350/311 |
| 3,970,358 | 1976 | Kozma ..................... 350/3.5 |

FOREIGN PATENT DOCUMENTS

1797574 Fed. Rep. of Germany.
1901822 Fed. Rep. of Germany.

OTHER PUBLICATIONS

Pennington, K. S. "Advances in Holography", Scientific American, vol. 215, No. 2, Feb. 1968, pp. 40-48.
Righini et al., "Reflection Holographic Filters for Compacting Optical Processors," Applied Optics, Vol. 13, No. 5, May 1974, pp. 1019-22.
Sweatt, "Designing and Constructing Thick Holographic Optical Elements," Applied Optics, Vol. 17, No. 8, April, 1978, pp. 1220-7.

*Primary Examiner*—Bruce Y. Arnold
*Attorney, Agent, or Firm*—Spencer & Kaye

[57] ABSTRACT

A color selective filter in the form of a holographic reflector is produced by a method which includes the step of exposing a photosensitive film of gelatine to a monochromatic laser beam. In order to obtain acceptably short exposure times and to enable substantially the whole of the available laser light to be utilized, a relatively narrow laser beam is sequentially scanned across the surface area of the gelatine film in a scanning pattern which consists of a large number of parallel straight lines. The diameter of the laser beam spot is very large as compared with the spacing between adjacent line scans. In this way each point on the gelatine film is scanned a very large number of times.

The laser beam 8 is generated by a laser 7 and deflected by two movable mirrors 10 and 11, which are controlled so that the beam scans the whole of the gelatine film 1.

9 Claims, 4 Drawing Figures

COLOR SELECTIVE FILTERS

BACKGROUND OF THE INVENTION

This invention relates to colour selective filters and is particularly concerned with such filters in the form of a holographic reflector. It is extremely difficult to produce a filter which produces only a relatively narrow band colour when illuminated by broad band light, such as white light. For many applications, conventional colour selective filters which rely on the selective absorption within the filter of unwanted colours are insufficiently precise. Improved results can, in principle be obtained by the use of colour selective filters which are constituted in the form of reflecting holograms—these are sometimes termed holographic reflectors. Whilst it has proved possible to produce a very small holographic reflector having an acceptable performance, the corresponding performance for relatively large area holographic reflectors has proved to be unsatisfactory.

SUMMARY OF THE INVENTION

The present invention seeks to provide a method of making a colour selective filter in the form of a holographic reflector in which the optical performance is not adversely dependent on the size of its useful area.

According to this invention, a method of making a colour selective filter in the form of a holographic reflector includes the steps of: illuminating a photosensitive film with a beam of light from a coherent monochromatic laser in which the area of the beam spot on the film is small as compared with the total area of the film; moving the laser beam relative to the film so that each point on the area of the film is illuminated a large number of times and the total illumination received by each point is substantially constant; causing a wave derived from the illuminating beam to interfere with the illuminating beam; and developing the film so as to change the latent image thereon into a colour selective filter.

Preferably the beam is scanned systematically over the surface of the film in a sequence of line scans with adjacent line scans being spaced apart by a distance which is small compared with any dimension of the beam spot on the film.

Preferably again the beam is arranged to scan sequentially across the surface of the film in a series of straight lines which are parallel to each other, with movement of the beam from one straight line to the next being accomplished in abrupt steps.

The surface of the photosensitive film may be flat or curved.

Preferably the photosensitive film comprises a layer of gelatine which is located at the surface of a rigid transparent plate with the gelatine being exposed by the laser beam after the beam has traversed the plate.

Preferably yet again, the surface of the film which is remote from said glass plate is closely adjacent to a smooth highly reflecting surface. The colour selective properties of the film stem from the presence of standing wave patterns, which are set up within it when the laser beam is reflected at the highly reflecting surface.

Subsequent to the illumination of the photosensitive film by the laser beam, it is processed so as to fix within it changes in its internal properties which correspond to the reflection pattern caused by the laser beam. Typically these changes are manifest as localised variations in the refractive index of the film.

BRIEF DESCRIPTION OF THE DRAWINGS

The invention is further described by way of example with reference to the accompanying drawings in which.

DESCRIPTION OF THE PREFERRED EMBODIMENTS

A colour selective filter in accordance with the present invention comprises a thin film of transparent gelatine, which is supported by a relatively thick optically transparent plate of glass. The filter is intended to operate in the reflective mode, that is to say, when broad band illumination (i.e. white light) is incident upon the input side of the filter most of the light is transmitted through the filter, but a selected portion of the spectrum is reflected by the filter. The reflected portion constitutes an extremely narrow part of the optical spectrum and can approximate a single wavelength. Hence, the light reflected by the optical filter is highly colour selective. The colour reflected by the filter is normally arranged to be the colour of the laser beam used to form the filter, but this is not necessarily the case.

Figure 1:
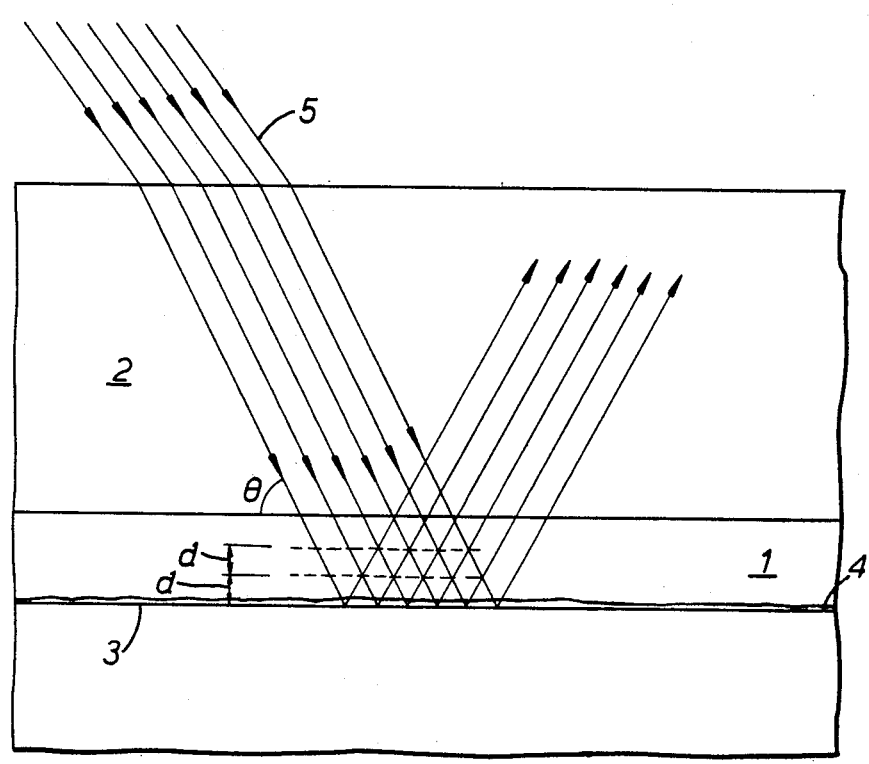
FIG. 1 is an explanatory diagram showing the exposure of a photosensitive gelatine film to an incident laser beam.

FIG. 1 shows a section through a colour filter in accordance with the present invention and illustrates one stage in the process of its manufacture. A sensitised photosensitive gelatine film 1 is positioned in contact with a supporting transparent glass plate 2. In practice, the film 1 is deposited upon the glass plate 2, so as to form a bond therewith. The film 1 is positioned above a highly reflecting surface 3, so as to be almost in contact therewith. A very thin layer of liquid 4 is place between the reflecting surface 3 and the gelatine film 1 so as to avoid the presence of air gaps and voids being present between them. The liquid 4 is arranged to have substantially the same refractive index as the film 1, so that the interface between the liquid and the film does not present an optical discontinuity. The gelatine film 1 is illuminated by a beam of laser light 5, which is incident at the angle $\theta$ to the reflecting surface 3. The angle $\theta$ determines the effective colour of the reflector, as explained subsequently. The light reflected by the highly reflecting surface 3 passes through the gelatine film 1 again, setting up standing waves within the layer and the intensity variation in the standing waves is converted into corresponding variations in the refractive index of the gelatine film by the subsequent development process.

The gelatine layer is initially sensitised by immersion in a solution of ammonium dichromate, which is typically 5% by weight concentration. Excess solution is allowed to drain from the gelatine layer which is then dried in air at about 10% to 50% relative humidity-typically about 40% relative humidity-for up to 24 hours. The gelatine layer is then exposed to the laser beam, which typically may be obtained from an argon ion laser having a wavelength of 488 nanometers or 514 nanometers. It is the angle at which the gelatine layer is exposed to the argon ion laser beam which determines the ultimate reflection characteristic of the layer. The layer is then typically processed by washing it in running water at about 20° C. for ten minutes after which it is immersed in a 50% mixture. of isopropyl alcohol, (IPA) and water for three minutes, and then subsequently in pure IPA for a further three minutes after which excess IPA is removed using an absorbent lens tissue. The gelatine layer is subsequently dried and baked in a warm oven at about 70° C. or more for about ten to fifteen minutes or more. This process produces variations in the refractive index of the gelatine layer which result in constructive interference when the gelatine layer is illuminated by wavelengths of the appropriate value. The layer is subsequently encapsulated, to protect it from atmospheric moisture, using another glass plate and a transparent optical cement.

The value d shown in FIG. 1 is related to the wavelength λ of reflective light by the expression:

$$d = \lambda/(2 \sin \theta)$$

If it is desired to produce a colour selective reflector which reflects light having the same wavelength as the laser beam which is used to produce the reflector, the angle $\theta$ will, of course, equal 90°. In practice, this is the most convenient case, since the laser beam can then strike the upper surface of the glass plate 2 at a direction perpendicular to its surface. Although in FIG. 1, the laser beam 5 is shown as being a parallel beam, in practice, it is more typically slightly divergent.

Figure 2:
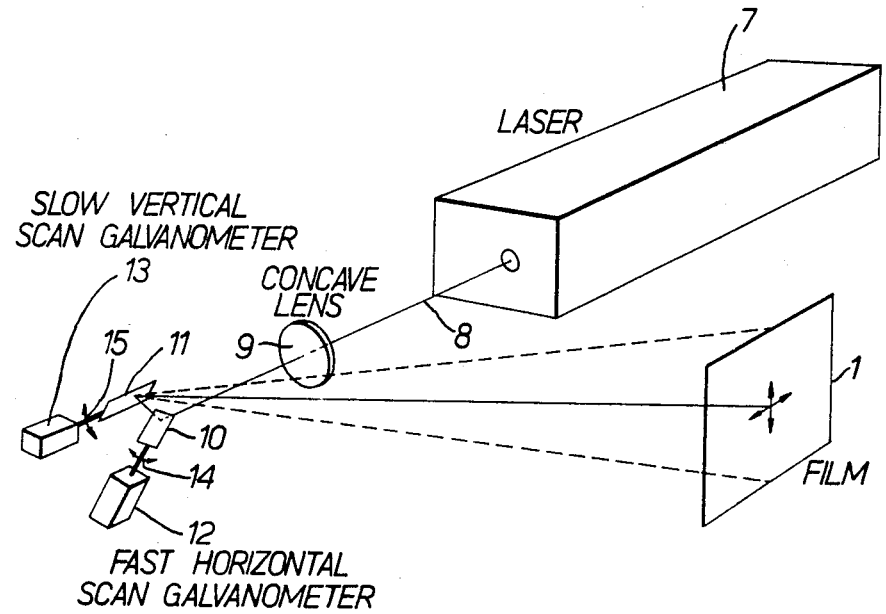
FIG. 2 shows the way in which the laser beam is arranged to scan the photosensitive film.

FIG. 2 shows the optical arrangement by means of which the laser beam is used to illuminate the gelatine film so as to photographically expose it. A parallel sided laser beam is generated within a laser 7. The laser 7 can itself be a standard optical generator which produces an essentially coherent monochromatic beam of light 8. This beam is passed through a lens 9, which is slightly concave so as to produce a divergent beam. The divergent beam is reflected in turn by two mirrors 10 and 11 on to the gelatine film 1. In FIG. 2, the gelatine film 1 is illustrated in a highly stylised manner and for the sake of clarity the glass plate 2 and the reflecting surface 3 are not shown. Two mirrors 10 and 11 are respectively carried by galvanometers 12 and 13, which are arranged to rotate the mirrors 10 and 11 about axes 14 and 15 so as to produce horizontal and vertical movement of the laser beam on the gelatine film 1. The galvanometer 12 is arranged to produce movement of the mirror 10 at a relatively high rate, which results in horizontal scanning of the laser beam across the gelatine filter 1, whereas the galvanometer 13 is arranged to produce a discrete stepping motion of the mirror 11, so as to produce vertical movement of the laser beam on the gelatine film 1.

It is necessary that both of the galvanometers 12 and 14 shall be capable of accurately controllable movement. Suitable optical scanners which incorporate mirrors are available from General Scanning Inc.

Figure 3:
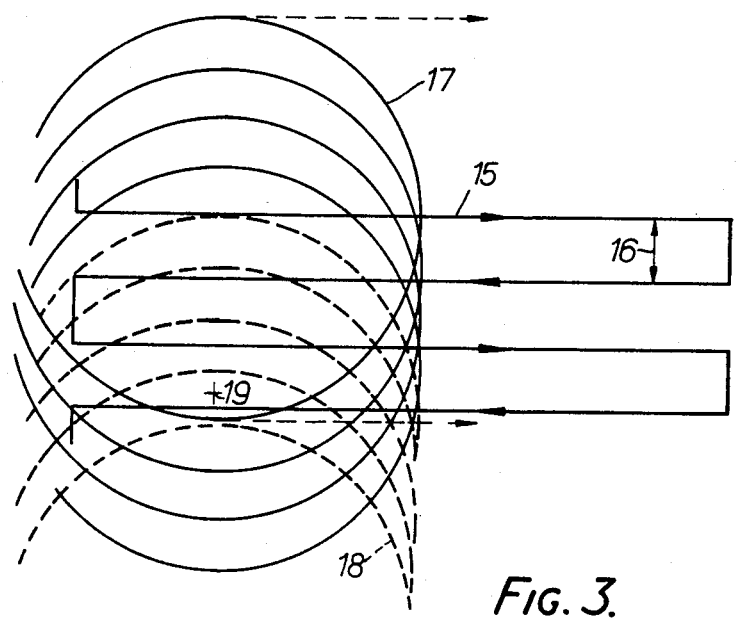
FIG. 3 is an explanatory diagram illustrating the scanning pattern of the laser beam and FIG. 4 shows in block diagrammatic form a control circuit for controlling the scanning of the laser beam.

The nature of the scanning pattern produced on the gelatine film 1 is shown in FIG. 3, in which the solid line 15 represents the optical centre of the divergent laser beam as it scans across the film 1. It will be seen that the laser beam scans a sequence of straight parallel lines, which are displaced from each other by a vertical distance 16 and that at the end of each line the laser beam jumps abruptly in the vertical direction to the start of the next horizontal line. The solid circle 17 represents the effective circumference of the laser beam as its centre moves along the horizontal scan line 15 and it will be seen that the effective diameter of the beam spot is very much greater than the distance 16. In practice, the intensity of illumination of the beam spot within the circumference 17 is not uniform, but varies in a marked Gaussian manner.

FIG. 3 shows only four horizontal lines 15 and the corresponding circumferences of the beam spot are shown in solid line with each beam spot being progressively displaced in a downwards vertical direction. The effective circumference of the beam spot for subsequent horizontal line scans is shown by the broken circles 18 and from this it will be seen that in the drawing the arbitrary point 19 receives illumination during a total of eight occasions when the laser beam is swept across it. The relative dimensions of FIG. 3 have been expanded for the sake of clarity and in practice, it is envisaged that each abritrary point 19 will receive illumination on at least fifty occasions. Thus, in practice, the distance 16 is very small indeed as compared with the diameter of the beam spot.

In this way it is assured that each arbitrary point 19 receives the same total level of illumination as all other points. This method of illuminating the gelatine film is very much more efficient than previous methods in which the whole of a gelatine film area has been illuminated at the same time by a very large diameter beam spot. In the previous method, it has been possible to utilise only the very centre of the beam spot in order to ensure that the illumination falling on the whole of the gelatine film is at least approximately constant. In practice, this has meant that 90% of the energy generated within the laser source has been wasted.

The practical effect of this is very great. Not only is the level of illumination essentially constant over the whole of the surface area of the gelatine film, but in addition, the total exposure time has been significantly reduced. Typically, a spot diameter of 5 mm. and an incremental scan distance 16 of about 0.1 mm has proved successful. This enables the total exposure time for any one point on the gelatine film to be reduced from about thirty minutes with the previous process to only ten seconds with the present arrangement. Of course, the total time required to scan the whole gelatine film will be much greater than ten seconds, but it should be noted that nearly all of the available light of the laser is utilised and moreover the gelatine film is not as susceptible to vibration or undesirable movement as previously. Previously any movement within the total exposure time of typically thirty minutes would seriously degrade the whole of the reflection hologram whereas now an isolated movement of the gelatine film will produce only very localised impairment of the hologram.

Figure 4:
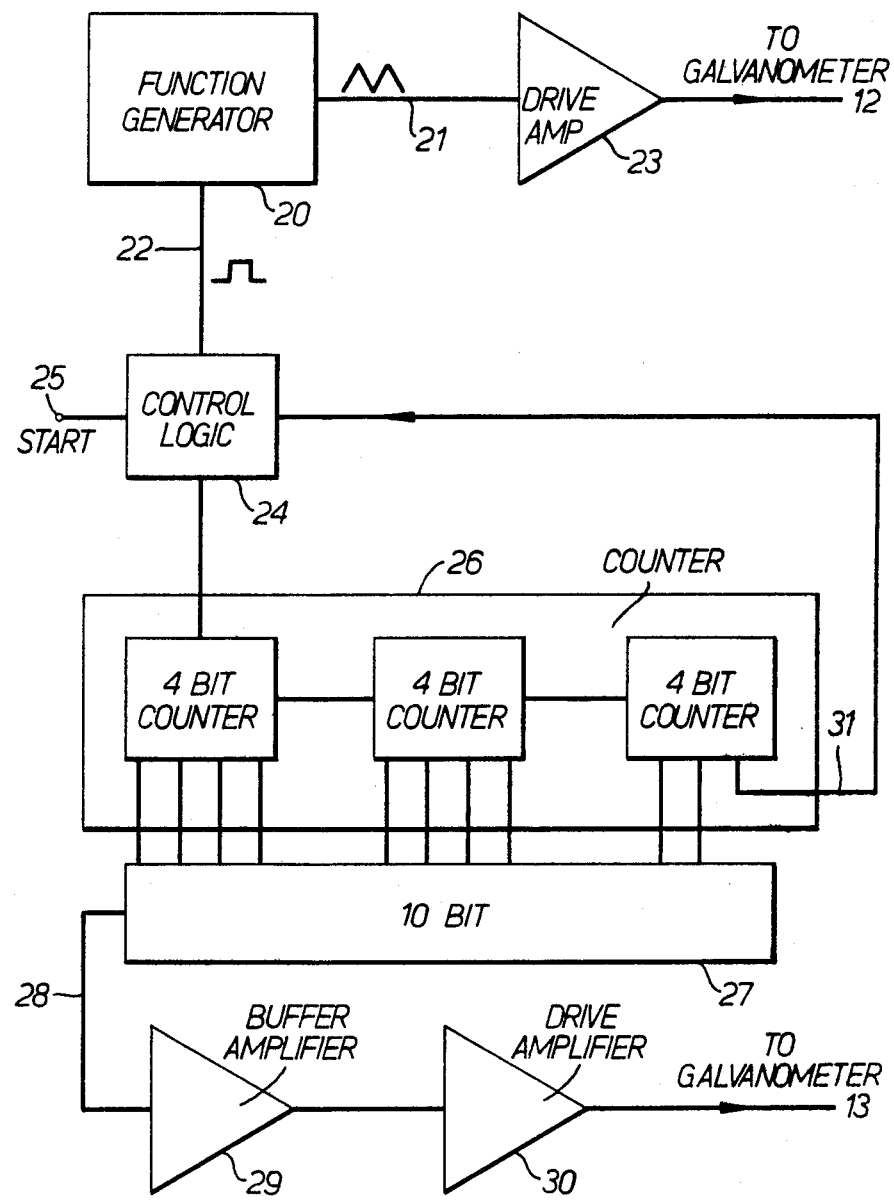

The way in which the two galvanometers 12 and 13 are controlled to provide the appropriate scanning pattern is illustrated in FIG. 4. In FIG. 4, a waveform generator 20 has two outputs 21 and 22, the former of which produces a triangular wave output and the second of which produces an inphase square wave having the same basic frequency. The triangular wave is amplified by a drive amplifier 23 and applied directly to the high frequency galvanometer 12, which produces the horizontal deflection. The triangular nature of the waveform produces steady movement of the mirror 10 in a backwards and forwards direction. The square wave signal is applied to a control logic device 24 having a start input 25. In practice, the start input 25 is connected to a push button, which when depressed feeds the square wave signal from the function generator 20 to a ten bit counter 26. The counter 26 is a standard three stage four bit counter, which counts the number of square wave pulses fed to it. Tens stages of the counter 24 are fed to a ten bit digital-to-analogue converter 27, which produces on output line 28 a rising staircase analogue voltage, which increases in value by one step whenever the counter 26 receives a pulse. The stair case voltage is applied via an output buffer amplifier 29 and a drive amplifier 30 to the galvanometer 13. Consequently the galvanometer 13 receives a relatively low frequency stepped input, which causes an abrupt movement of the mirror 11 at a frequency which corresponds to that of the function generator 20. In this way vertical movement of the laser beam is obtained at the end of each horizontal line scan. When an appropriate count of the counter 26 has been reached, a stop pulse is provided on line 31, which switches off the control logic device 24 to indicate that the gelatine film has been completely scanned and that its illumination has been completed.

Subsequently, the gelatine film is processed in the manner described previously so as to fix the variations in refractive index.

After the selective filter has been produced in this way, it subsequently reflects only light of a very narrow bandwidth when it is viewed in normal wide band, white light, illumination. It will be appreciated that the actual colour reflected is dependent also on the angle at which the filter is viewed and the wavelength of the laser light.

We claim:

1. A method of making a colour selective filter in the form of a holographic reflector including the steps of: illuminating a photosensitive film with a beam of light from a coherent monochromatic laser in which the area of the beam spot on the film is small as compared with the total area of the film; moving the laser beam relative to the film so that each point on the area of the film is illuminated a large number of times and the total illumination received by each point is substantially constant; causing a wave derived from the illuminating beam to interfere with the illuminating beam; and developing the film so as to change the latent image thereon into a colour selective filter.

2. A method as claimed in claim 1 and wherein the beam is scanned systematically over the surface of the film in a sequence of line scans with adjacent line scans being spaced apart by a distance which is small compared with any dimension of the beam spot on the film.

3. A method as claimed in claim 2 and wherein the beam is arranged to scan sequentially across the surface of the film in a series of straight lines which are parallel to each other, with movement of the beam from one straight line to the next being accomplished in abrupt steps.

4. A method as claimed in claim 2 and wherein the surface of the film is flat.

5. A method as claimed in claim 2 and wherein the surface of the film is curved to present a concave surface to the illuminating beam.

6. A method as claimed in claim 1 and wherein the photosensitive film comprises a layer of gelatine which is located at the surface of a rigid transparent plate, which surface is opposite the surface of said plate on which the illuminating beam is first incident, so that the gelatine is exposed by the laser beam after the beam has traversed the plate.

7. A method as claimed in claim 6 and wherein the surface of the film which is remote from said glass plate is closely adjacent to a smooth highly reflecting surface.

8. A method as claimed in claim 7 and wherein a thin film of liquid is interposed between said photosensitive film and said reflecting surface, with the refractive index of the liquid being at least approximately the same as that of the photosensitive film.

9. A colour selective filter when made by the method claimed in any of claims 1, 2, 3, 4, 5, 6, 7 or 8.

* * * * *